(12) United States Patent
Delavalle et al.

(10) Patent No.: US 6,715,764 B2
(45) Date of Patent: Apr. 6, 2004

(54) ASSEMBLAGE OF TWO PIECES OF BODYWORK FOR UNITING EDGE TO EDGE, A PIECE OF BODY WORK BELONGING TO SUCH AN ASSEMBLAGE, A VEHICLE BUMPER AND A VEHICLE FENDER

(75) Inventors: Dominique Delavalle, Marchon (FR); Francis Cordebar, Veyziat (FR); Gerald Andre, Oyonnax (FR); Claude Jacquemard, Oyonnax (FR)

(73) Assignee: Compagnie Plastic Omnium, Lyons (FR)

( * ) Notice: Subject to any disclaimer, the term of this patent is extended or adjusted under 35 U.S.C. 154(b) by 0 days.

(21) Appl. No.: 10/125,417

(22) Filed: Apr. 19, 2002

(65) Prior Publication Data
US 2002/0158484 A1 Oct. 31, 2002

(30) Foreign Application Priority Data
Apr. 19, 2001 (FR) .............................. 01 05330

(51) Int. Cl.[7] .......................... B62D 24/00; B62D 25/02
(52) U.S. Cl. ................. 276/29; 296/191; 296/198; 293/102
(58) Field of Search ............... 296/29, 1.1, 191, 296/146.7, 146.5, 198; 293/102, 141, 108, 121, 142, 120, 155; 52/591.5

(56) References Cited

U.S. PATENT DOCUMENTS

| | | | | |
|---|---|---|---|---|
| 3,140,891 A | * | 7/1964 | Shreffler | 296/1.1 |
| 4,109,951 A | * | 8/1978 | Weller | 293/108 |
| 5,108,138 A | * | 4/1992 | Kawaguchi | 293/120 |
| 5,226,695 A | * | 7/1993 | Flint et al. | 296/191 |
| 5,429,412 A | * | 7/1995 | Schoen et al. | 296/187 |
| 5,882,054 A | * | 3/1999 | Devilliers | 293/155 |
| 5,957,512 A | * | 9/1999 | Inada et al. | 293/102 |
| 6,010,169 A | * | 1/2000 | Cox et al. | 293/120 |
| 6,120,089 A | * | 9/2000 | Kalstiantz et al. | 296/183 |
| 6,422,643 B1 | * | 7/2002 | Pease | 296/194 |
| 6,428,074 B1 | * | 8/2002 | Sukegawa et al. | 296/29 |
| 6,435,602 B1 | * | 8/2002 | Sukegawa et al. | 296/191 |
| 6,554,341 B2 | * | 4/2003 | Lee | 296/29 |

FOREIGN PATENT DOCUMENTS

| | | | |
|---|---|---|---|
| DE | 1 575 260 A | 1/1970 | |
| EP | 99115 A2 | * 1/1984 | 296/191 |
| EP | 0 779 183 A1 | 6/1997 | |
| EP | 0 886 072 A1 | 12/1998 | |
| GB | 2 339 457 A | 1/2000 | |

* cited by examiner

Primary Examiner—Dennis H. Pedder
Assistant Examiner—Gregory Blankenship
(74) Attorney, Agent, or Firm—Oliff & Berridge, PLC

(57) ABSTRACT

The invention relates to an assemblage of two pieces of bodywork (1, 2) each having a flange (5, 6) for pressing against the flange of the other piece. Each flange carries at least one tongue (11, 12) extending towards the other piece. A fastener member (20) is suitable for engaging around the tongues so to prevent them from moving relative to one another once said two pieces of bodywork are in a predetermined position in which they are united flange against flange. The invention also provides the pieces of bodywork constituting said assemblage.

20 Claims, 7 Drawing Sheets

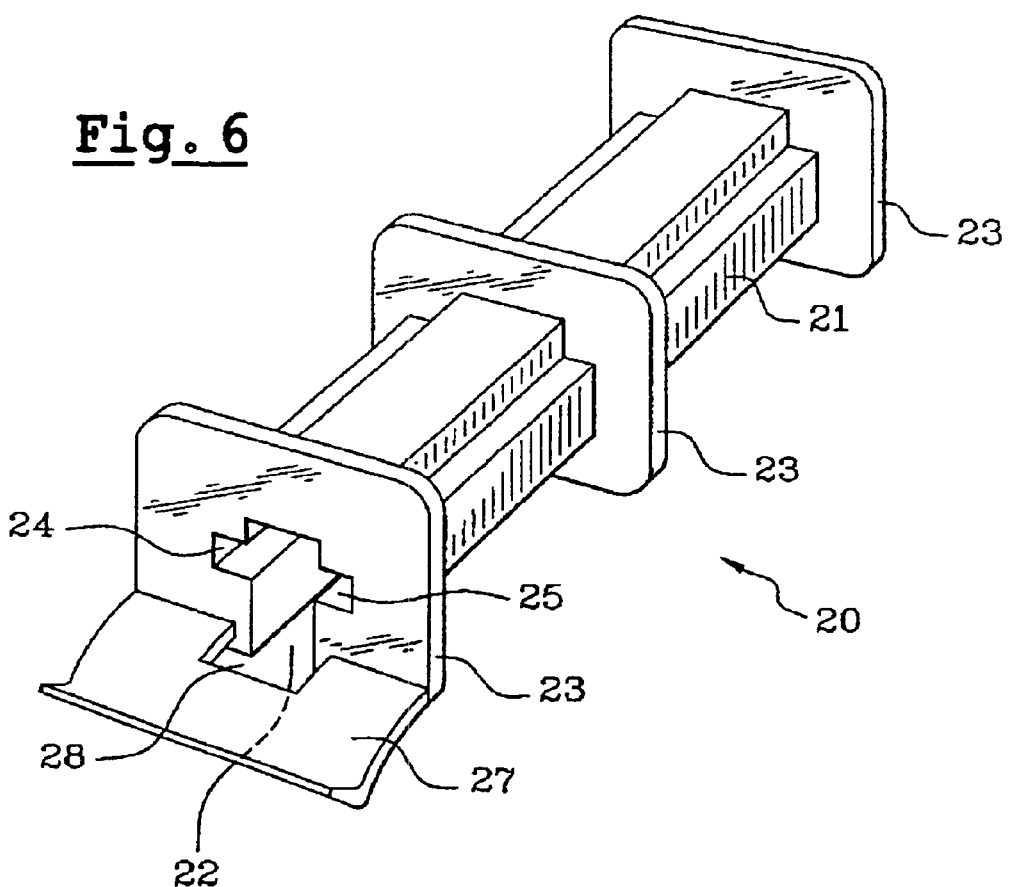
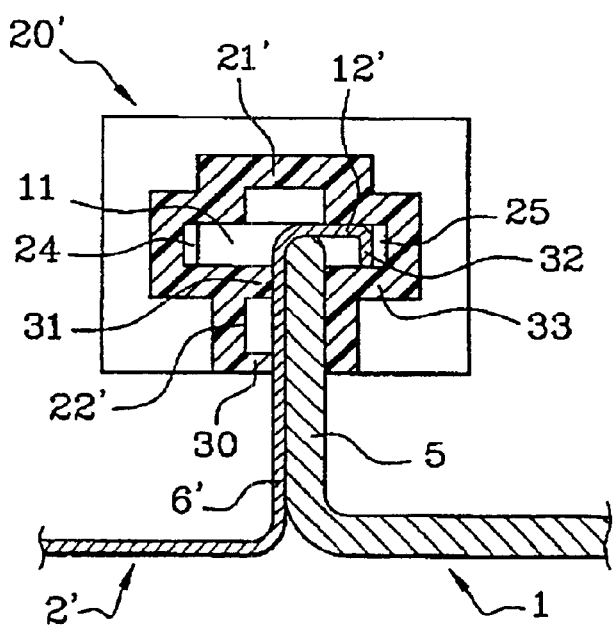

ASSEMBLAGE OF TWO PIECES OF BODYWORK FOR UNITING EDGE TO EDGE, A PIECE OF BODY WORK BELONGING TO SUCH AN ASSEMBLAGE, A VEHICLE BUMPER AND A VEHICLE FENDER

The present invention relates to an assemblage of two pieces of bodywork for uniting edge to edge, and to a piece of bodywork belonging to such an assemblage.

Pieces of bodywork are requiring to be positioned relative to one another with ever-increasing accuracy in order to guarantee a pleasing appearance for a vehicle.

In this context, various solutions have already been devised consisting in fixing each piece of bodywork accurately to the structure of the vehicle, while taking care that adjacent pieces of bodywork benefit on their contiguous edges from fixing points that are adjacent or even identical.

The fixing means used in those solutions need to be relatively strong since they also serve to support the pieces of bodywork while simultaneously ensuring that they are properly positioned relative to one another.

Those fixing means are generally constituted by separate fittings, often made of metal, thereby giving rise to problems of cost both in terms of supplies and in terms of labor.

The present invention seeks to provide a novel assemblage of two pieces of bodywork which can be assembled together simply and quickly and which ensures very accurate relative positioning between the two pieces.

The present invention provides an assemblage of two pieces of bodywork, each piece having an outside face and a flange substantially perpendicular to said outside face and suitable for pressing against the flange of the other piece, the assemblage being characterized in that each flange carries at least one tongue extending towards the other piece beyond the flange of said other piece, the assemblage further comprising a fastener member suitable for engaging around the tongues and for preventing them from moving relative to one another when in a predetermined position in which the two pieces of bodywork are united flange against flange.

Within the meaning of the invention, the term "flange" is used to designate a portion projecting from the edge of the piece of bodywork.

It will be understood that the invention provides simple means for connecting together the facing edges of the two pieces, in a manner that is simultaneously robust, simple, and quick, and without requiring numerous fittings to be added for fastening purposes.

By means of the invention, the two pieces of bodywork are prevented from moving relative to each other in three directions by means of their tongues and by means of the single fastener member.

In a particular embodiment of the invention, each flange carries a plurality of tongues, each of which can be engaged between two tongues of the other flange.

Preferably, the tongues of one flange are spaced apart in pairs by a distance substantially equal to the width of the tongue on the other flange that is to be interposed between them.

For example, on each of the two pieces of bodywork, the width of the tongues can be constant and equal to the spacing between two tongues. Under such circumstances, the tongues belong alternately to one and to the other one of the two pieces of bodywork and they interlock so as to prevent one another from moving.

This interlocking of the tongues is readily understood by analogy with the position of the hands of a person who has interlocked fingers.

In a particular embodiment of the invention, the fastener member has at least one open cavity enabling it to cover two tongues together with at least a portion of the two flanges of two assembled-together pieces, said cavity having at least one bearing point against each tongue and at least one bearing point against each flange.

According to various particular characteristics of the invention:

the end of each tongue tapers so as to make it easier to insert between two tongues on the other edge;

each tongue extends substantially perpendicularly to the flanges:

the tongues are oriented in such a manner that the two pieces of bodywork assemble together along the longitudinal axis of the vehicle;

the fastener member is a rigid section member of cross-section in register with the cavity that defines internally at least a portion of the outlines of the cross-sections of the tongues and at least a portion of the outlines of the cross-sections of the flanges of the two assembled-together pieces;

the fastener member is a resilient section member having two branches defining the cavity and suitable for splaying apart from each other by elastic deformation to allow the two tongues to pass through the opening into the cavity;

at least one of the pieces carries means for snap-fastening with the fastener member so as to hold the fastener member on the tongues of the two flanges;

at least one of the two pieces is made of a thermoplastic or thermosetting plastics material; and the fastener member is made of plastics material.

The invention also provides a piece of bodywork having an outside face and a flange substantially perpendicular to said outside face, the piece of bodywork being characterized in that said flange carries at least one tongue extending transversely to said flange and projecting beyond said outside face.

In a particular embodiment, the piece of bodywork has a plurality of tongues spaced apart in pairs.

Advantageously, the piece of bodywork includes means for snap-fastening with a fastener member engaged on its flange.

In order to make the invention easier to understand, there follows a description of embodiments as non-limiting examples, and made with reference to the accompanying drawings, in which:

FIG. 6 is a perspective view of the fastener member;

FIG. 7 is a view analogous to FIG. 3 showing another embodiment;

FIG. 1 shows a fragment of two pieces of bodywork for a motor vehicle, specifically a bumper 1 and a fender 2 which are to be assembled together in accordance with the invention.

Figure 1:
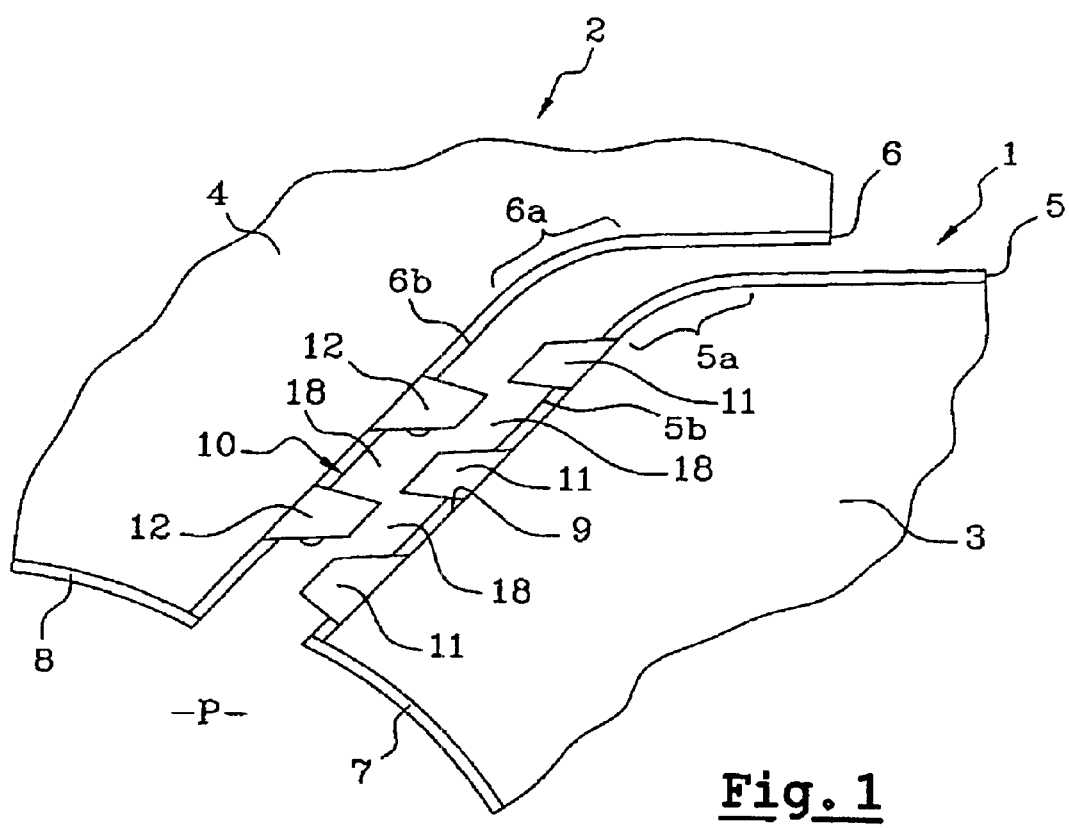
FIG. 1 is a fragmentary view of the inside face of a front fender and bumper of a motor vehicle.

In FIG. 1, P designates a wheel arch.

The bumper 1 and the fender 2 are made by molding a plastics material, possibly together with reinforcement.

The bumper 1 comprises a wall 3 with only the inside face thereof being visible in FIG. 1.

The fender 2 comprises a wall 4 whose outside face (not visible in FIG. 1) needs to be positioned substantially as a continuation of the outside face of the wall 3 of the bumper 1.

Flanges 5, 6 and rims 7, 8 extend substantially perpendicularly from the walls 3 and 4: at the interface between the fender and the bumper for the flanges 5, 6; and around the wheel arch P for the rims 7, 8.

These flanges 5, 6 and rims 7, 8 are made integrally with the respective walls 3 and 4 and they extend substantially perpendicularly to the plane of FIG. 1.

The rims 7, 8 join the flanges 5, 6 substantially perpendicularly.

As can be seen in FIG. 1, each of the flanges 5 and 6 comprises two rectilinear portions situated at opposite ends of respective rounded portions 5a, 6a.

The rectilinear portions which extend from the rounded portions 5a and 6a to the wheel arch P are referenced 5b and 6b respectively.

On their respective free edges 9 and 10, the rectilinear flanges 5b and 6b are provided with respective transverse tongues 11, 12 extending substantially parallel to the walls 3 and 4.

The bumper 1 thus has a series of tongues 11 extending perpendicularly from the flange 5 towards the fender 2, while the fender 2 has a series of tongues 12 extending perpendicularly from the flange 6 towards the bumper 1.

Figure 2:
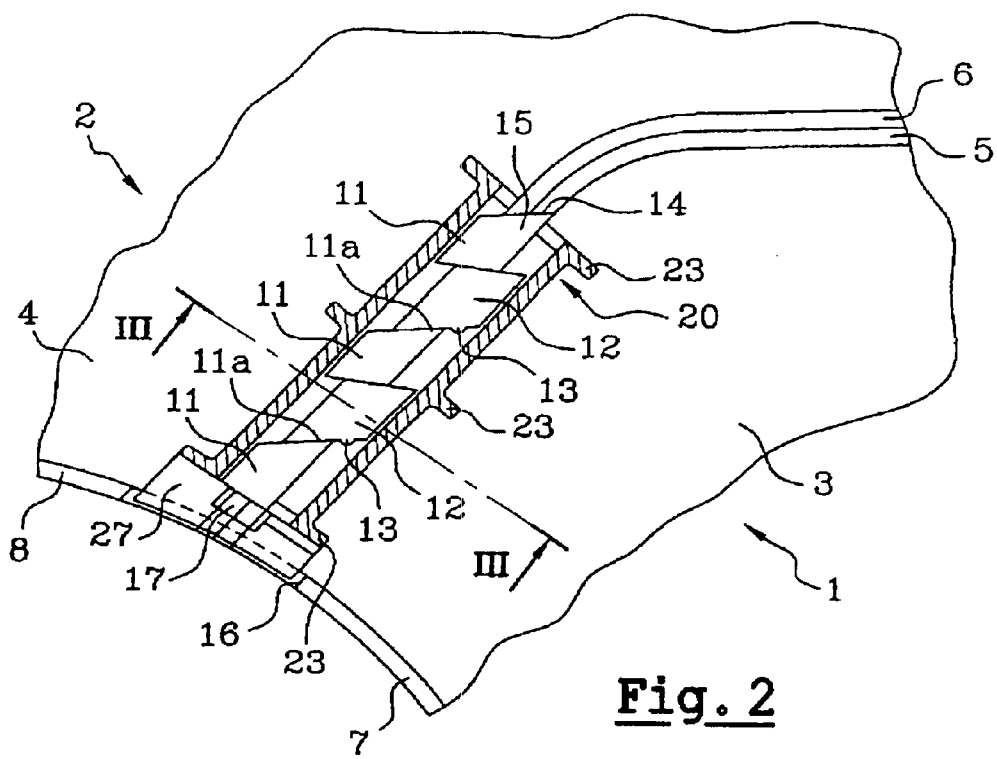
FIG. 2 is a section view on II—II of FIG. 3 showing the two pieces assembled together by means of a fastener member.
Figure 3:
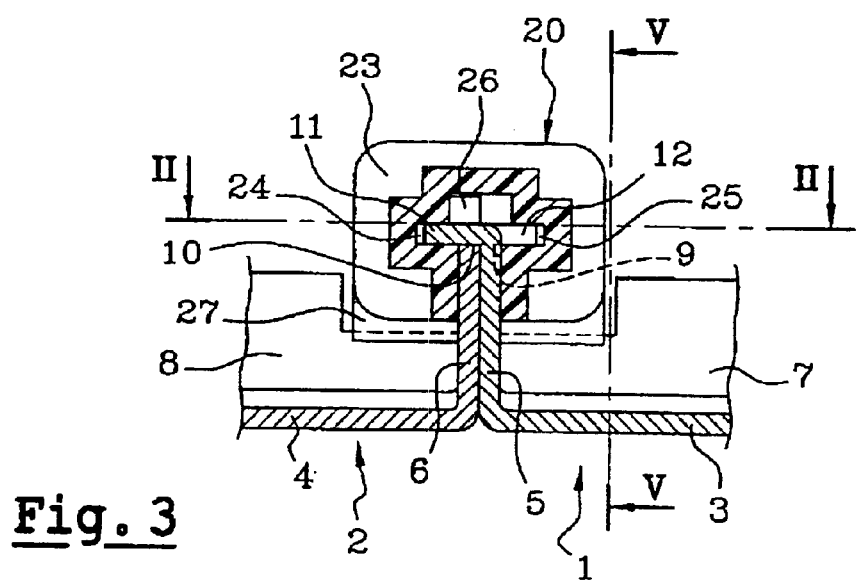
FIG. 3 is a section view on III—III of FIG. 2.

As can be seen in FIG. 3, the length of each tongue 11, 12 is greater than the thickness of the adjacent flange 6, 5 of the other piece, such that when the flanges 5, 6 touch each other, as shown in FIGS. 2 and 3, each tongue 11, 12 has an end portion projecting beyond said adjacent flange.

The tongues 11, 12 are spaced apart in pairs over each flange so as to leave gaps 18 between them that are suitably sized for receiving the tongues 12, 11 of the other flange 6, 5.

Thus, when the pieces are assembled together, the tongues 11, 12 interfit between one another like the interlocked fingers of two hands, as can be seen in FIG. 2.

In order to make it easier to move the two parts together, each tongue 11, 12 is of a tapering shape, with its broader end being on the flange from which said tongue extends.

The number of interfitting tongues is selected in particular as a function of the length of the flanges to be assembled together and of the mechanical strength desired of the assembly.

When the tongues 11, 12 are interfitted and the flanges 5, 6 are resting one against the other, the tongues 12 bear substantially against the free edge 9 of the flange 5 and the tongues 11 bear substantially against the free edge 10 of the flange 6, as can be seen in FIG. 3.

For at least one of the two series of tongues, and specifically for the series of tongues 12 in the example shown, the tongues also include, on one of their two sides, respective projections 13 situated at locations that are selected in such a manner that a corner 11a of the edge of an adjacent tongue 11 situated beside the flange 5 comes to bear against the projection 13 once the parts are assembled together, as can be seen in FIG. 2.

The projections 13 are passed with associated elastic deformation and/or friction while the two pieces are being brought together, and thereafter they provide a certain amount of resistance to the two pieces being separated, thereby temporarily keeping them in the assembled-together position while a fastener member is being put into place, as explained below.

Figure 4:
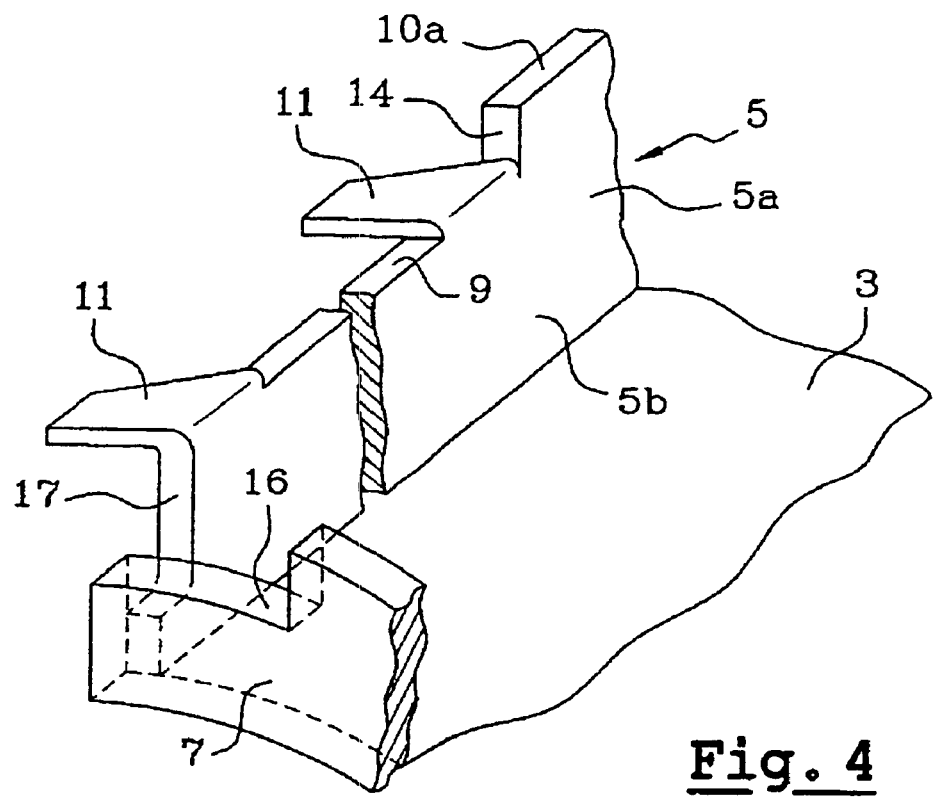
FIG. 4 is a perspective view of the corner of a fender.

As can be seen in FIG. 4, at least one of the flanges 5 and 6 presents a step 14 to act as an end-of-stroke abutment during insertion of the fastener member 20.

The free edge 10 of the rectilinear portion 5b of the flange 5 carrying the tongues 11 is situated at a level that is lower than that of the free edge 10a of the rounded portion 5a that extends the portion 5b and that does not have any tongues, with the difference in level corresponding to the height of the step 14.

The flange 5 also has such a step 15, these two steps 14 and 15 together defining a substantially plane surface that acts as an abutment for the fastener member, as can be seen in FIG. 2.

The rims 7 and 8 provide a cutout 16 defining an opening giving access to the tongues from the wheel arch P.

Adjacent to the rims 7, 8, each of the flanges 5 and 6 has a notch 17 whose function is described below.

Each notch 17 is formed by reducing the height of the flange 5, 6 where it joins the associated rim 7 or 8.

The fastener member 20 is described below, shown on its own in FIG. 6 and together with the assembled-together bodywork pieces in FIGS. 2, 3, and 5.

The fastener member 20 comprises an elongate body essentially in the form of a rigid section member 21 presenting an internal cavity of constant cross-section that is downwardly open via a longitudinal opening 22 and generally cross-shaped, as can be seen in particular in FIG. 3.

The outside cross-section of the member 21 is also generally cross-shaped and the fastener member 20 carries stiffening ribs 23 at locations that are spaced apart along its length, these ribs extending over the entire outside periphery of the member and seeking to prevent any splaying apart of the two halves of the member that are situated on either side of the longitudinal opening.

The width of the longitudinal opening 22 of the member 21 corresponds to the combined thickness of the flanges 5 and 6 when they are touching each other, thereby preventing them from moving apart once the fastener member 20 is in place.

The inside cross-section of the member 21 defines two lateral grooves 24 and 25 of width corresponding substantially to the thickness of the tongues 11 and 12 respectively which engage therein, as can be seen in FIG. 3.

The depth of the lateral grooves 24 and 25 is slightly greater than the length of the tongues 11 and 12.

When the member 21 is engaged on the tongues 11 and 12, the flanges 5 and 6 are prevented from moving vertically relative to each other, with the tongues 11, 12 bearing simultaneously via their top faces and their bottom faces against the member 21, as can be seen in FIG. 3.

A space 26 is provided inside the member 21, above the tongues 11, 12 (not including their ends) so as to reduce friction thereagainst, thereby making the fastener member 20 easier to slide while it is being put into place.

As mentioned above, the fastener member 20 is inserted through the opening defined by the cutout 16 and giving access to the wheel arch.

Figure 5:
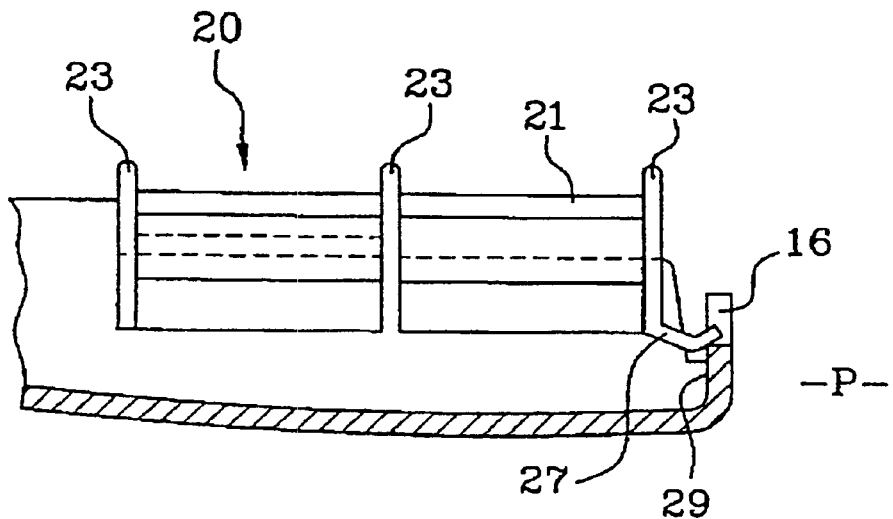
FIG. 5 is a side view seen looking along arrow V of FIG. 3.

In order to hold it in position on the tongues, the fastener member 20 has an elastically deformable retaining tab 27 at its rear end, as can be seen in FIG. 5.

The retaining tab 27 extends rearwards, sloping slightly relative to the remainder of the member. When the member is in place on the tongues, the free end of the tab engages in the notches 17.

In a middle zone, the retaining tab 27 has a recess 28 to leave space for the flanges 5 and 6, thus enabling said resilient tabs to deform without coming into abutment against them.

At the end of the stroke whereby the fastener member 20 is engaged on the flanges 5 and 6, the tab 27 deforms elastically so as to get past the cutout 16, after which it comes to bear against the inside face 29 of the rims 7 and 8, as shown in FIG. 5.

The fastener member 20 is then prevented from moving at the front by coming into abutment against the steps 14 and 15 and at the rear by the tab 27 pressing against the rims 7 and 8.

The assembly can be dismantled by withdrawing the fastener member 20 after lifting the resilient tab 27 and then moving the fender 2 away from the bumper 1 once they have been disconnected.

In the example described, the fastener member 20 is inserted over the tongues and is withdrawn therefrom by sliding parallel to the plane of contact between the rectilinear portions 5b and 6b of the flanges 5 and 6.

It will be observed that because of the orientation of the tongues, the bumper 1 is assembled with the flange 2 along an axis X that is substantially horizontal and parallel to the axis of the vehicle, thus making it easier to insert the bumper 1.

The two pieces to be assembled together can both be made of plastics material, as described above, with the thicknesses of the flanges 5 and 6 and also of the tongues 11 and 12 then preferably being substantially identical.

The invention also makes it possible to assemble together two pieces made of metal or a piece of plastic with a piece made of metal and not having the same thicknesses.

By way of example, FIG. 7 shows a bumper 1 identical to that described above assembled with a fender 2' made of sheet metal, the fender 2', like the fender 2 described above, having a flange 6' arranged to press against the flange 5 of the bumper 1 and a plurality of tongues 12' arranged to interfit between the tongues 11 so as to prevent relative movement between the two pieces along the assembled-together edges.

A fastener member 20' serves to hold the bumper 1 assembled with the fender 2'.

The fastener member 20' comprises a section member 21' which differs from the above-described member 21 essentially by the presence in the opening 22' of the member 21' of two longitudinal ribs 30 and 31 for compensating for the smaller thickness of the flange 6' compared with the flange 6.

The ribs 30 and 31 press against the flange 6' so as to enable the member 20' to prevent the flanges 5 and 6' from moving apart.

The tongues 12' have respective flanges 32 formed by folding the end of each tongue 12' downwards through a right angle so as to compensate for the difference in thickness between the sheet metal from which the tongues 12' are made and the height of the side groove 25.

The flange 32 can present a rounded bottom free edge 33 so as to reduce the area of contact with the bottom wall of the groove 25 and make it easier to engage the member 21'.

The height of the flange 32 corresponds substantially to the height of the lateral grooves 24 and 25 so that the fastener member 20' prevents any relative vertical displacement between the flanges 5 and 6'.

In the embodiments described above, the fastener member is put into place by a sliding movement along its longitudinal axis, thereby enabling said fastener member to be assembled blind starting from an end passage, and it is particularly suitable for assembling together bodywork pieces on a vehicle, where access to the edges that are to be assembled together is often difficult.

It would not go beyond the ambit of the present invention for the fastener member to be put into place on the tongues by being moved in a direction other than the longitudinal direction of the fastener member, for example in a direction that is perpendicular to the longitudinal axis of the fastener member, as described below with reference to FIGS. 8 to 10.

In this case, it is necessary to have access to the flanges over their entire length in order to assemble the pieces together and the invention is thus more suitable for use in pre-assembling pieces prior to mounting them on the vehicle.

Figure 8:
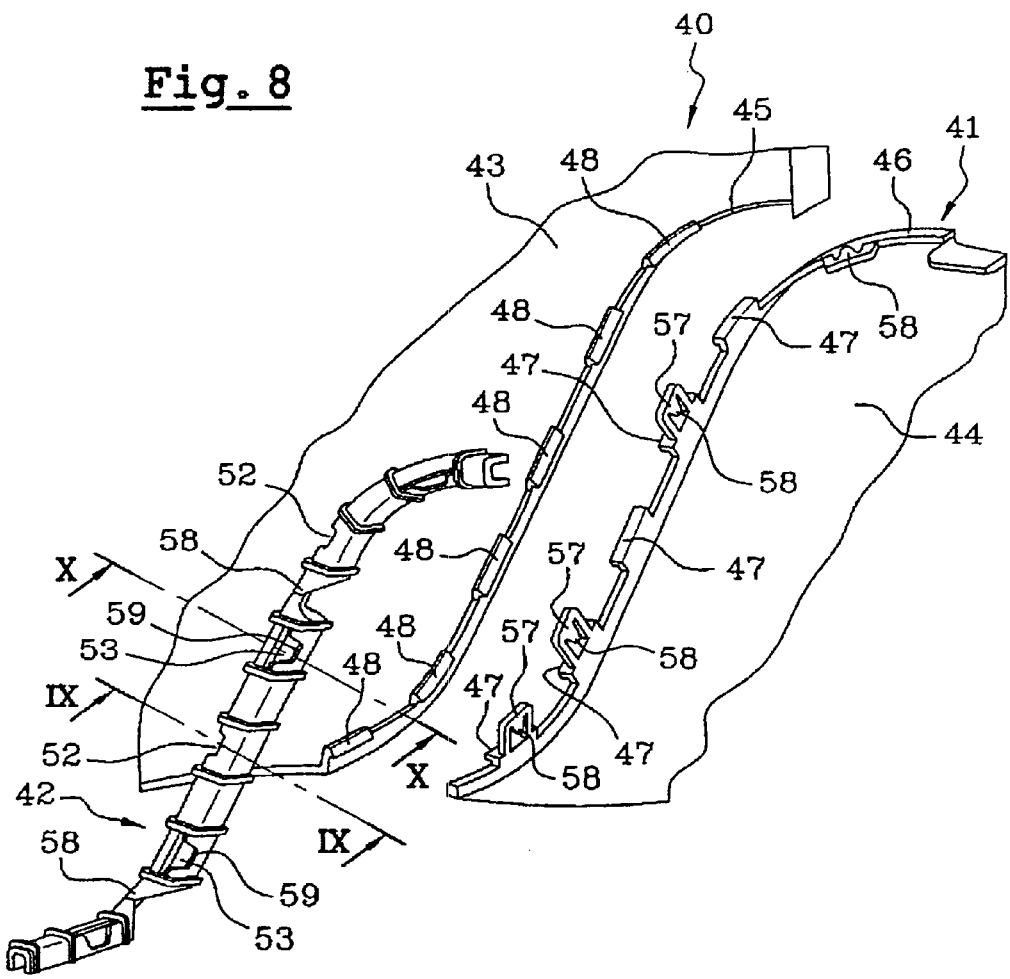
FIG. 8 is a perspective view showing two portions of a bumper shield that are to be united using a fastener member constituting another embodiment of the invention.

FIG. 8 shows two bumper elements 40 and 41 that are to be assembled together in accordance with the invention by means of a fastener member 42.

Each bumper element 40, 41 comprises a wall 43, 44 with the outside surfaces of these walls 43 and 44 that are to be placed so as to be in continuity with each other.

To this end, each element has a flange 45, 46 that bears against the flange of the other piece.

Figure 9:
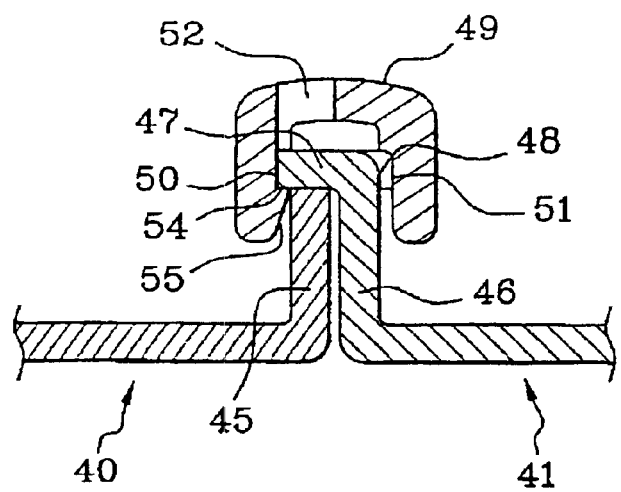
FIG. 9 is a section view on IX—IX of FIG. 8 with the two shield portions assembled together.

As can be seen in particular in FIG. 9, each flange 45, 46 has tongues 47, 48 on its free edge that are directly towards the other piece of bodywork, and that are regularly spaced apart by distances equal to the widths of a tongue so that a tongue 47 on one of the pieces of bodywork can engage between two adjacent tongues 48 on the other piece of bodywork, when the pieces of bodywork are brought together.

Like the fastener member 20 in FIG. 6, the fastener member 42 is constituted by a section member 49 defining on its inside longitudinal portions of lateral grooves 50 and 51 that are dimensioned to receive the ends of the tongues 47, 48 that project beyond the flanges 46, 45 of the other piece.

In order to accommodate unmolding constraints, these grooves 50 and 51 are defined only over portions of the length of the section member facing punched-out portions 52, 53 situated alternately on either side of the longitudinal midplane of the member and enabling longitudinal bearing surfaces 54 to be formed that define the bottoms of said groove portions.

In this embodiment, the member 49 is suitable for opening by elastic deformation so as to allow it to be put into place on the two flanges. For this purpose, it has chamfers 55 beneath each longitudinal bearing surface 54, these chamfers bearing against the tongues 47, 48 when the fastener member is inserted in a direction perpendicular to its longitudinal direction so as to widen the opening 56 in order to engage both tongues in the grooves 50 and 51.

As can be seen in FIG. 8, some of the tongues 47 support projections 57 which constitute snap-fastening means for the fastener member. Each projection 57 has a resilient tab 58

(more clearly visible in FIG. 10) which extends laterally beyond the projection going away from the tongue 47 and which co-operates with the punched-out portion 53 in register with the projection when said fastener member is in place.

The punched-out portion 53 is situated in the half of the transverse section of the fastener member that is situated beside the resilient tab and it is defined downwards (when in the orientation shown in FIG. 10) by an abutment 59 for retaining the resilient tab 58. Upwards, the punched-out portion 53 leaves sufficient clearance to enable a user to stress the resilient tab 58 in the projection 57 so as to release it from the abutment 59, thereby enabling the fastener member 42 to be extracted. During such extraction, the ends of the tongues 47, 48 cause the opening 56 to open up by elastically deforming the member 49.

The fastener member 42 is thus easily snap-fastened onto the flanges and is easily removable.

As shown in FIG. 8, the flanges 45 and 46 are sinusoidal in shape and this shape is followed closely by the fastener member 42.

The fastener member 42 is a single piece of molded plastics material, and immediately after being unmolded it can present the required sinusoidal shape for positioning on the flanges 45 and 46. Nevertheless, for molding purposes, it can be preferable to make it "flat", i.e. in a rectilinear configuration, and to interpose hinges between adjacent rectilinear portions so as to allow it to take up a configuration that is substantially sinusoidal. Thus, in the example of FIG. 8, the hinges are constituted by flexible portions 60 of narrow section. In a variant (not shown), the hinges are constituted by portions of elastomer that are co-molded with the plastics material constituting the remainder of the fastener member 42.

Figure 10:
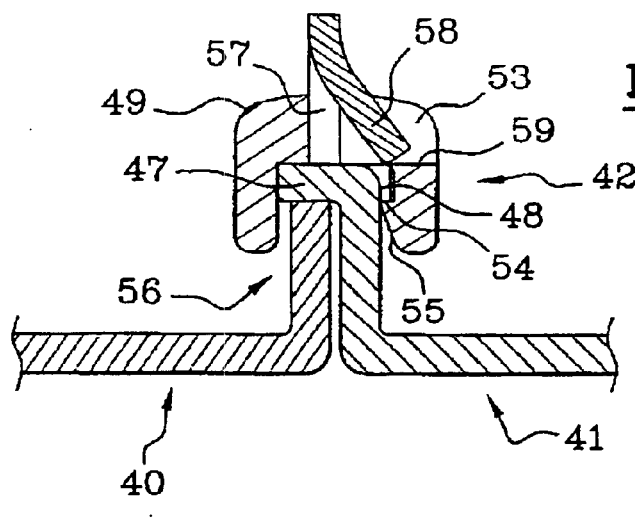
FIG. 10 is a section view on X—X of FIG. 8, with the two shield portions assembled together.

Although not shown in FIGS. 9 and 10, it is preferable to move the fastener member as close as possible to the inside faces of the pieces while nevertheless accommodating the rounded shape of the bodywork which can make it necessary to maintain a certain amount of spacing between the fastener member and said pieces.

Figure 11:
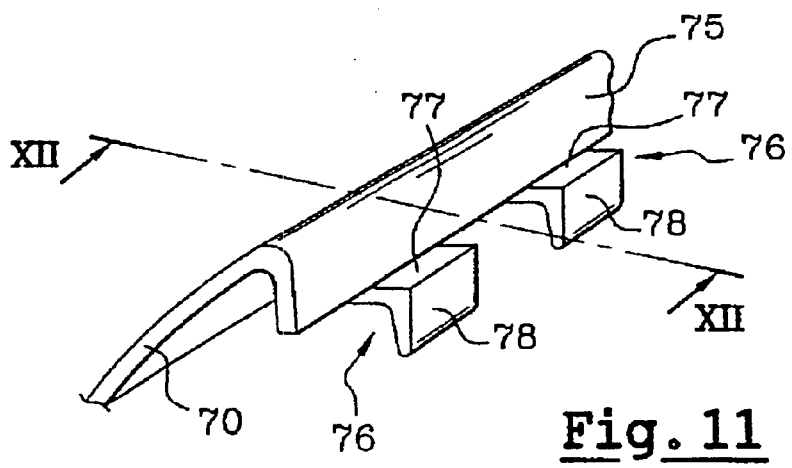
FIG. 11 is a perspective view showing a portion of a bumper element constituting another embodiment of the invention.
Figure 12:
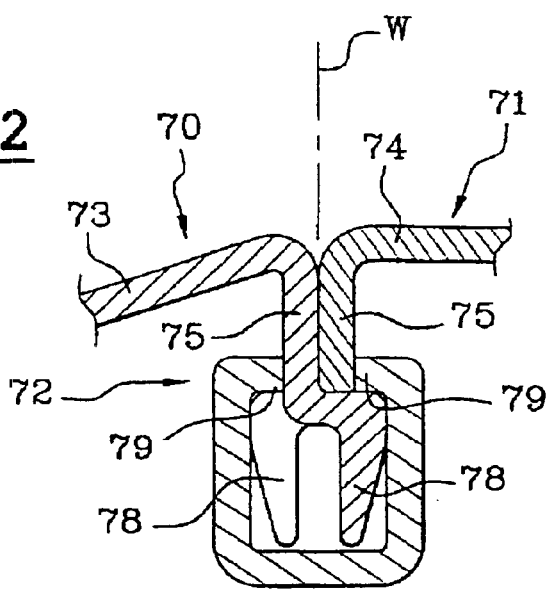
FIG. 12 is a section view on XII—XII of the FIG. 11 element united with another piece of bodywork.
Figure 13:
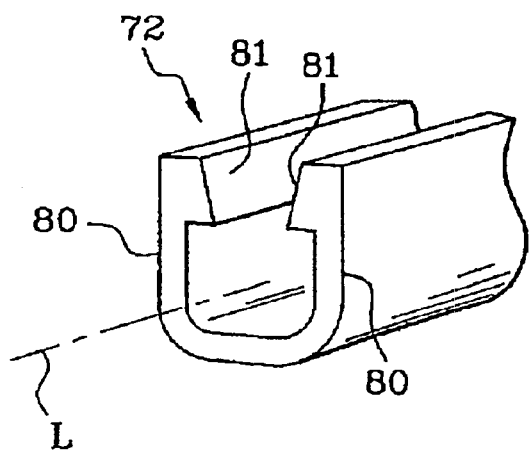
FIG. 13 is a perspective view of the fastener member.

FIG. 11 shows a bumper element 70 for assembling in accordance with the invention to a fender 71 shown in section together with the bumper in FIG. 12, assembly being performed by means of a fastener member 72 made of plastics material and shown on its own in FIG. 13.

The bumper element 70 and the fender 71 include respective walls 73 and 74 with the outside surfaces of these walls 73 and 74 being for placing so as to be in continuity with each other.

Each of the pieces 70 and 71 has a flange 75 that bears against the flange of the other piece.

As can be seen in particular in FIG. 11, the free edge of each flange 75 carries tongues 76 pointing towards the other piece of bodywork and regularly spaced apart at intervals equal to the width of a tongue 76 so that a tongue 76 on one of the pieces of bodywork can be engaged between two adjacent tongues 76 of the other piece of bodywork when the two pieces of bodywork 70 and 71 are brought together.

Each tongue 76 comprises a base portion 77 extending perpendicularly from the flange 75 and an end portion 78 extending perpendicularly to the base portion 77, being directed inwards, i.e. downwards in FIG. 11.

As can be seen in FIG. 12, the width of the base portion 77 is greater than the thickness of the flange 75 so that when the pieces of bodywork 70 and 71 are brought together it defines a projecting catch 79.

The member 72 is generally in the form of a channel-section member having an open cross-section made up of two side branches 80 with inwardly-directed rims 81 at their free ends.

When the member 72 is engaged on the pieces of bodywork 70 and 71, the rims 81 engage on the catches 79 while the free ends of the portions 78 of the tongues bear against the web of the channel-section member.

This provides a positive connection along three axes between the bumper element 70 and the fender 71, separation or approach movements being prevented by the section member clamping on the flanges 75, shear movements being prevented by the interfitting tongues 76, and planar shift movements being prevented by the tongues pressing both against the rims 81 and against the web of the section member.

The section member 72 is snapped onto the tongues 76 by being moved in a direction W perpendicular to its longitudinal axis L.

The fastener member can have handle means for making assembly easier.

Figure 14:
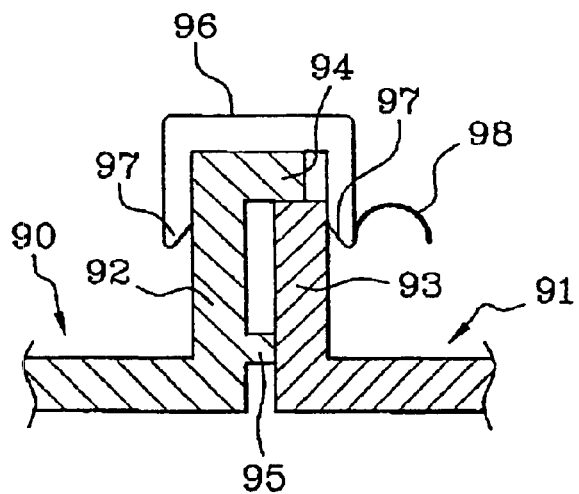
FIG. 14 is a view analogous to FIG. 12 showing another embodiment.

By way of example, FIG. 14 shows an assembly comprising two pieces of bodywork 90 and 91 together with at least one fastener member 96.

The pieces of bodywork 90 and 91 have respective flanges 92 and 93, the free ends of these flanges presenting tongues 94 extending perpendicularly to the corresponding flanges and towards the flange of the other piece of bodywork.

The tongues 94 of the flanges 92 and 93 are arranged to interfit when the pieces of bodywork 90 and 91 are brought together.

The flange 92 has a projection 95 on its bottom portion (relative to FIG. 14) for bearing against the flange 93 of the other piece of bodywork 91.

This projection 95 serves to maintain predetermined clearance between the pieces of bodywork 90 and 91.

The fastener member 96 is made of metal and is in the form of a channel-section member with hooks 97 at the ends of the side branches of the channel section, said hooks being suitable for hooking on the flanges 92 and 93.

The fastener member also has handle means 98 enabling an operator to spread its two side branches apart using a finger or a tool, thus enabling it to be removed.

Naturally, the invention is not limited to the embodiments described above.

In addition to the tongues and the handle member, it is also possible to provide means for reinforcing the connection, for example conventional fastening elements.

What is claimed is:

1. An assemblage of two pieces of bodywork (1, 2, 2', 40,41, 70, 71, 90, 91) each piece having an outside face and a flange (5, 6, 6', 45, 46, 75, 92, 93) substantially perpendicular to said outside face and intended for pressing against the flange of the other piece, the assemblage being characterized in that each flange carries at least one tongue (11, 12, 12', 47, 48, 76, 94) extending towards the other piece beyond the flange of said other piece, the assemblage further comprising a fastener member (20, 20', 42, 72, 80, 96) suitable for engaging around the tongues and for preventing them from moving relative to one another when in a predetermined position in which the two pieces of bodywork are united flange against flange.

2. An assemblage according to claim 1, characterized in that each flange (5, 5', 6, 45, 46, 75, 92, 93) carries a plurality of tongues (11, 12, 12', 47, 48, 76, 94), each of which can be engaged between two tongues of the other flange.

3. An assemblage according to claim 2, characterized in that the tongues of one flange are spaced apart in pairs by a distance (18) substantially equal to the width of the tongue on the other flange that is to be interposed between them.

4. An assemblage according to claim 2, characterized in that a free end of each tongue (11, 12) tapers making it easier to insert between two tongues of the other flange.

5. An assemblage according to claim 1, characterized in that each tongue (11, 12, 12', 47, 48, 94) is plane and extends substantially perpendicularly to its flange.

6. An assemblage according to claim 1, characterized in that the tongues are oriented in such a manner that the two pieces of bodywork assemble together along the longitudinal direction of a vehicle.

7. An assemblage according to claim 1, characterized in that the fastener member (20, 20', 42, 72, 80, 96) has at least one open cavity enabling it to cover two tongues together with at least a portion of the two flanges of two assembled-together pieces, said cavity having at least one bearing point against each tongue and at least one bearing point against each flange.

8. An assemblage according to claim 7, characterized in that the fastener member (20, 20') is a rigid section member of cross-section in register with the cavity that defines internally at least a portion of the outlines of the cross-sections of the tongues and at least a portion of the outlines of the cross-sections of the flanges of the two assembled-together pieces.

9. An assemblage according to claim 7, characterized in that the fastener member (42, 72, 80, 96) is a resilient section member having two branches defining the cavity and suitable for splaying apart from each other by elastic deformation to allow the two tongues to pass through the opening into the cavity.

10. An assemblage according to claim 1, characterized in that at least one of the pieces (41) carries means (58) for snap-fastening with the fastener member (42) so as to hold the fastener member on the tongues (47, 48) of the two flanges (45, 46).

11. An assemblage according to claim 1, characterized in that at least one of the two pieces (1, 2, 40, 41, 70, 71, 90, 91) is made of a thermoplastic or thermosetting plastics material.

12. An assemblage according to claim 1, characterized in that the fastener member (20, 20', 42, 72, 80) is made of plastics material.

13. A piece of bodywork having an outside face and a flange substantially perpendicular to said outside face, the piece of bodywork being characterized in that said flange carries at least one tongue extending transversely to said flange and projecting beyond said outside face, and in that the at least one tongue is intended to be inserted between tongues of another piece.

14. A piece of bodywork according to claim 13, characterized in that it has a plurality of tongues spaced apart in pairs.

15. A vehicle bumper having an outside face and a flange substantially perpendicular to said outside face, the vehicle bumper being characterized in that said flange carries at least one tongue extending transversely to said flange and projecting beyond said outside face, and in that the at least one tongue is intended to be inserted between tongues of another piece.

16. A vehicle fender having an outside face and a flange substantially perpendicular to said outside face, the vehicle fender being characterized in that said flange carries at least one tongue extending transversely to said flange and projecting beyond said outside face, and in that the at least one tongue is intended to be inserted between tongues of another piece.

17. An assemblage of a motor vehicle bumper and a motor vehicle fender constituting two pieces of body work (1, 2, 2', 40, 41, 70, 71, 90, 91) each piece having an outside face and a flange (5, 6, 6', 45, 46, 75, 92, 93) substantially perpendicular to said outside face and intended for pressing against the flange of the other piece, the assemblage being characterized in that each flange carries at least one tongue (11, 12, 12', 47, 48, 76, 94) extending towards the other piece beyond the flange of said other piece, the assemblage further comprising a fastener member (20, 20', 42, 72, 80, 96) suitable for engaging around the tongues and for preventing them from moving relative to one another when in a predetermined position in which the two pieces of bodywork are united flange against flange.

18. A piece of bodywork having an outside face and a flange substantially perpendicular to said outside face, the piece of body work being characterized in that said flange carries at least one tongue extending transversely to said flange and projecting beyond said outside face, and in that it includes means for snap-fastening with a fastener member engaged on its flange.

19. A vehicle bumper having an outside face and a flange substantially perpendicular to said outside face, the vehicle bumper being characterized in that said flange carries at least one tongue extending transversely to said flange and projecting beyond said outside face and in that it includes means for snap-fastening with a fastener member engaged on its flange.

20. A vehicle fender having an outside face and a flange substantially perpendicular to said outside face, the vehicle fender being characterized in that said flange carries at least one tongue extending transversely to said flange and projecting beyond said outside face and in that it includes means for snap-fastening with a fastener member engaged on its flange.

* * * * *